US011855426B1

(12) United States Patent
Smart (10) Patent No.: US 11,855,426 B1
(45) Date of Patent: Dec. 26, 2023

(54) DIP CABLE PROTECTION DEVICE AND SYSTEM USING SAME

(71) Applicant: Zalinca Corp., Arnprior (CA)

(72) Inventor: Loren R. Smart, Stittsville (CA)

(73) Assignee: Zalinca Corp., Arnprior (CA)

( * ) Notice: Subject to any disclaimer, the term of this patent is extended or adjusted under 35 U.S.C. 154(b) by 0 days.

(21) Appl. No.: 17/817,462

(22) Filed: Aug. 4, 2022

(51) Int. Cl.
| | | |
|---|---|---|
| *H02G 3/04* | (2006.01) | |
| *F16L 3/04* | (2006.01) | |
| *F16L 3/26* | (2006.01) | |

(52) U.S. Cl.
CPC .............. *H02G 3/0437* (2013.01); *F16L 3/04* (2013.01); *F16L 3/26* (2013.01); *H02G 3/0406* (2013.01)

(58) Field of Classification Search
None
See application file for complete search history.

(56) References Cited

U.S. PATENT DOCUMENTS

| | | | | |
|---|---|---|---|---|
| 2,230,734 A * | 2/1941 | Van Antwerp | ......... | H02G 7/205 52/717.06 |
| 3,162,720 A * | 12/1964 | Phillips | ................... | H02G 7/205 174/45 R |
| 3,216,684 A * | 11/1965 | Larson | .................... | F16B 45/02 248/74.1 |
| 3,454,706 A * | 7/1969 | Willox | ................... | H02G 7/205 174/45 R |
| 3,580,982 A * | 5/1971 | Havewala | .............. | H02G 7/205 174/45 R |
| 3,740,455 A * | 6/1973 | Willox | ................... | H02G 7/205 174/45 R |
| 4,470,433 A * | 9/1984 | Vipond | ................... | E21B 17/20 174/47 |
| 6,740,817 B1 * | 5/2004 | Anderson | .............. | H02G 11/02 174/138 R |

(Continued)

FOREIGN PATENT DOCUMENTS

JP         2004350418 A   * 12/2004

OTHER PUBLICATIONS

Engineering Specification—Duct Pole Lateral for Wood Pool, https://static.hydroottawa.com/documents/specifications/UDS0023.pdf, retrieved on Jul. 20, 2022.

(Continued)

*Primary Examiner* — Krystal Robinson
(74) *Attorney, Agent, or Firm* — Stratford Group Ltd.

(57) ABSTRACT

Described are various embodiments of a dip cable protection device and system using same. In one embodiment, the dip cable protection device provides improved protection against damage to dip cables. In addition, one or more such dip protection devices can be stacked and installed against a same utility pole, such as a telecommunication pole having one or more dip cables, thus providing a full dip cable protection system. The system comprises at least one rubber dip protection device that is vertically engaged against a vertically oriented pole so as to enclose and protect in a cavity formed thereby the dip cables. The device can be easily partially buried, via a ground level indicator, to provide protection above and below ground level. Additional protection devices can be vertically stacked or mounted via a raised tab and recess on the top and bottom edges of the adjacent devices, respectively.

16 Claims, 9 Drawing Sheets

(56) References Cited

U.S. PATENT DOCUMENTS

2017/0141556 A1* 5/2017 Santos ................ H02G 3/0493

OTHER PUBLICATIONS

Steel Cable Guards (U-Guards), https://outsideplant.colonialteltek.com/viewitems/steel-cable-guards-boots-straps/steel-cable-guards-u-guards, retrieved Aug. 2, 2022.
Prime Conduit,inc, U-Guards, https://www.linemen-tools.com/U_Guard_Polyguard_PVC_Riser_Duct_s/636.htm, retrieved Jul. 20, 2022.

* cited by examiner

SECTION A-A

FIG. 2B

DETAIL G

SECTION D-D

FIG. 6C

DETAIL E

FIG. 6D

SECTION F-F

SECTION A-A

DIP CABLE PROTECTION DEVICE AND SYSTEM USING SAME

FIELD OF THE DISCLOSURE

The present disclosure relates to dip cable protection, and in particular to an improved dip cable protection device and system using same.

BACKGROUND

There are multiple reasons why it is necessary for power, multipair communications, coax cables and fiber optic cables to be placed on a pole vertically. To enter an underground duct structure or be directly buried in the ground are the 2 main reasons. This brings these cables down to locations where they can now be interacted with by man, nature or machines so the amount of required protection to keep these cables save and, more importantly, to keep people safe from them, is greatly increased. The common name given to cables that enter the ground from a pole to go under a road or pathway or any obstruction and re-emerge at another location or pole cables is that of "DIP" cables. Everyday things such as lawn mowers or snowplows can cause significant damage to the cable and place the operators of these equipment in grave danger. If some damage goes undetected and/or not reported, this danger carries forward to passers-by or curious animals for an unknowable time. Hours, days, weeks, years potentially.

The current method of protecting cables varies depending on the value of the communications being carried on the cable or the potential of the cable to cause severe harm to people or things. Normally the cable starts down the pole with minimal or even no added protection. As the cable nears the ground there can be PVC pipe protection, plastic, or metal U Guard or even both. The bottom 1 to 3 feet may have increased protection, and this is normally concrete, especially for power cables that can harm people and equipment or high value traffic fibre communications cables. This concrete Dip Protection is:
- costly;
- can be easily damaged and degraded by seasonal conditions and cause other un-intended damage;
- is very difficult to remove or repair; and
- very prone to poor craftmanship.

For example, the current method of digging out beside a pole, building a form adequate to hold +/−1000 pounds of concrete, arranging, and scheduling a delivery of concrete, ensuring it is properly poured and protected and then returning 24 to 48 hours later to re-expose the concrete, remove the forms and finish the landscaping can involve 2 contractors, up to 16 manhours and multiple trips to the job site involving travel time, Job site protection. Safety concerns can be an issue depending on location and proximity to roads, sidewalks, pathways, etc. Furthermore, concrete Dip Protection cannot be easily removed and normally involves heavy equipment such as Jack-Hammers, picks, possibly a backhoe etc. This greatly increases the time, cost and possibility of un-intended damage to existing cables. After removal and completion of pole, replacement, addition of wiring or repair, a complete new concrete protection device must be re-installed incorporating new forms, new concrete, and a return trip by 2 men 24 to 48 hours later to remove the forms and finish the landscaping.

In addition, concrete is susceptible to cracking and water getting into cracks can freeze and expand these defects over time. This in turn can cause the device that is intended to protect cables to actually become detrimental to the integrity of these same cables. This structure will then need to be removed and replaced at great cost and waste.

In very cold weather it is impractical to attempt to pour concrete and expect good results, especially in small size jobs. Concrete must cure and dry and freezing winter conditions impedes this process. The installation of these devices must then be rescheduled to a more suitable time of year potentially leaving Dip wires improperly protected and susceptible to damage for several months. Also, from time to time these Dip Protection devices will be subject to damage from things such as snowplow blades, truck bumpers or the like depending on their physical location. Concrete can and will break under the right circumstances which means that replacement may be necessary and because of things outside the control of the utility involved, these replacements may be much more often and more expensive than normal.

Concrete is the current material of choice for this purpose currently. The positive is that it can be shaped to suit the specific location and made larger or smaller dependent on the need of the location. The material hardens well and forms a very protective barrier from snow blades, mowers etc. The downside is that they are very dependent on craftmanship and can be easily made improperly, crooked, ugly, and flawed (cracks, uneven etc.). After the concrete is cured it is practically impossible to correct any of these defects without complete removal and starting over. These flaws lead to a variety of issues from movement to cracking and breaking, causing damage to the ducts and cables they are intended to protect. Because they are extremely difficult to repair, these conditions worsen over time and fail to provide the protection required for several years before they are replaced.

In addition, the cost of these concrete messes has risen drastically since their inception many years ago. Most use less than 1 Cu.yd. of cement to make but the minimum deliverable amount is now approaching $500 in some parts of Ontario. These barriers quite often have metal rods (rebar) inserted adding to a possibility of un-intended contact. Moreover, cement is also a known greenhouse gas contributor.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

There is a need for an improved dip cable protection device and system using same that allows to protect a plurality of dip cables fastened to a cylindrical utility pole without the disadvantages of known techniques and devices. For example, the dip cable protection device and system described herein allows to stack multiple protection devices advantageously vertically along a same utility pole via the presence of raised tabs and recesses on the top and bottom edges of adjacent devices so as to form along the length thereof a cavity for housing and protecting a plurality of dip cables therein. In addition, the protection devices can be easily installed and replaced, in contrast to concrete-using solutions.

For example, in accordance with one aspect, there is provided a dip cable protection device for protecting one or more dip cables affixed on a side of a cylindrical pole, the device comprising: a single-piece elongated body of a strong and resilient material, the body having a substantially cylindrical curvature along a vertical orientation defining a convex exterior surface and a concave interior surface, and comprising: curved flanges coupled to each lateral side of the single-piece body, each curved flange having a curvature substantially matching the curvature of the cylindrical pole and configured for engaging against the side of said cylindrical pole so as to define a vertical cavity between the side of the cylindrical pole and the interior concave surface of the body, said cavity enclosing the one or more dip cables.

In one embodiment, each curved flange comprises near an outer lateral edge thereof a plurality of vertically elongated and vertically aligned slots for receiving therethrough a fastener to fasten the dip cable protection device on the cylindrical pole.

In one embodiment, each slot of said plurality of vertically elongated and vertically aligned slots is surrounded by an indented rounded rectangular portion configured for receiving a metal plate therein.

In one embodiment, said dip cable protection device is configured so as to be vertically stackable.

In one embodiment, said single-piece body comprises a top edge and a bottom edge, the top edge comprising along a width thereof a raised tab portion configured to engage a corresponding recess portion along a same width of the bottom edge for vertically stacking two or more dip cable protection devices.

In one embodiment, said raised tab portion comprises a notch portion in the middle thereof oriented perpendicularly to the raised tab portion, the notch portion being engageable on a corresponding notch receiving portion on the recess portion of the bottom edge of the device.

In one embodiment, said convex exterior surface comprises thereon a ground level marker for indicating a depth at which the dip cable protection device can be buried.

In one embodiment, said convex exterior surface comprises thereon a recess therein for receiving an information plate or label.

In one embodiment, said strong and resilient material is rubber.

In one embodiment, said concave interior surface comprises a plurality of ribs defined therein forming a honeycomb structure.

In one embodiment, said single-piece elongated body has embedded therein a RFID or NFC tag for storing data.

In one embodiment, said data comprises information selected from the group consisting of: an installation date, ownership, installer name, installer location, and inventory number.

In accordance with another aspect, there is provided a dip cable protection system for protecting a plurality of dip cables fastened to a cylindrical pole, the system comprising: a plurality of dip cable protection devices, each dip cable protection device comprising a single-piece elongated body of a strong and resilient material, the body having a substantially cylindrical curvature along a vertical orientation defining a convex exterior surface and a concave interior surface, and curved flanges coupled to each lateral side of the single-piece body, each curved flange having a curvature substantially matching the curvature of the cylindrical pole and configured for engaging against the side of said cylindrical pole so as to define a vertical cavity between the side of the cylindrical pole and the interior concave surface of the body, said cavity enclosing the one or more dip cables; wherein said single-piece body of each dip cable protection device comprises a top edge and a bottom edge, the top edge comprising along a width thereof a raised tab portion configured to engage a corresponding recess portion along a same width of the bottom edge for vertically stacking two or more dip cable protection devices; wherein said convex exterior surface of each dip cable protection device comprises thereon a ground level marker for indicating a depth at which the dip cable protection device can be buried; and wherein said plurality of dip cable protection devices are engaged against the cylindrical pole and vertically stacked one above another via engagement of said raised tab portion with said recess portion of two adjacent dip cable protection devices, said plurality of dip cable protection devices having each cavity vertically aligned for housing said plurality of dip cables.

In one embodiment, one of said plurality of dip cable protection devices is partially buried at a base of the cylindrical pole at a depth corresponding to the ground level marker.

In one embodiment, each curved flange of each of said plurality of dip cable protection devices comprises near an outer lateral edge thereof a plurality of vertically elongated and vertically aligned slots for receiving therethrough a fastener to fasten the dip cable protection device on the cylindrical pole.

In one embodiment, said fastener includes a lag screw and a washer.

In one embodiment, said fastener includes a band engaged in two opposite slots wrapping around the cylindrical pole.

Other aspects, features, and/or advantages will be become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Elements of the several drawings are illustrated for simplicity and clarity and have not necessarily been drawn to scale. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Described herein, in accordance with different embodiments, is a dip cable protection device and system using same. In some embodiments, the dip cable protection device provides improved protection against damage to dip cables. In addition, one or more such dip protection devices can be stacked and installed against a same utility pole, such as a telecommunication pole having one or more dip cables, thus providing a full dip cable protection system. The system comprises at least one rubber dip protection device that is vertically engaged against a vertically oriented pole so as to enclose and protect in a cavity formed thereby the dip cables. The device can be easily partially buried, via a ground level indicator, to provide protection above and below ground level. Additional protection devices can be vertically stacked or mounted via a raised tab and recess on the top and bottom edges of the adjacent devices, respectively. The whole system can be dug out, installed, backfilled and landscaped in under 4 manhours in a single trip to the jobsite. In addition, different sizes may be provided for different pole/cable configurations. If damaged, replacement can be done, if necessary, possibly by 1 man in less than 4 hours at significantly less cost. Moreover, the system can be installed at practically any time of year making them a much more practical option.

Figure 1A:
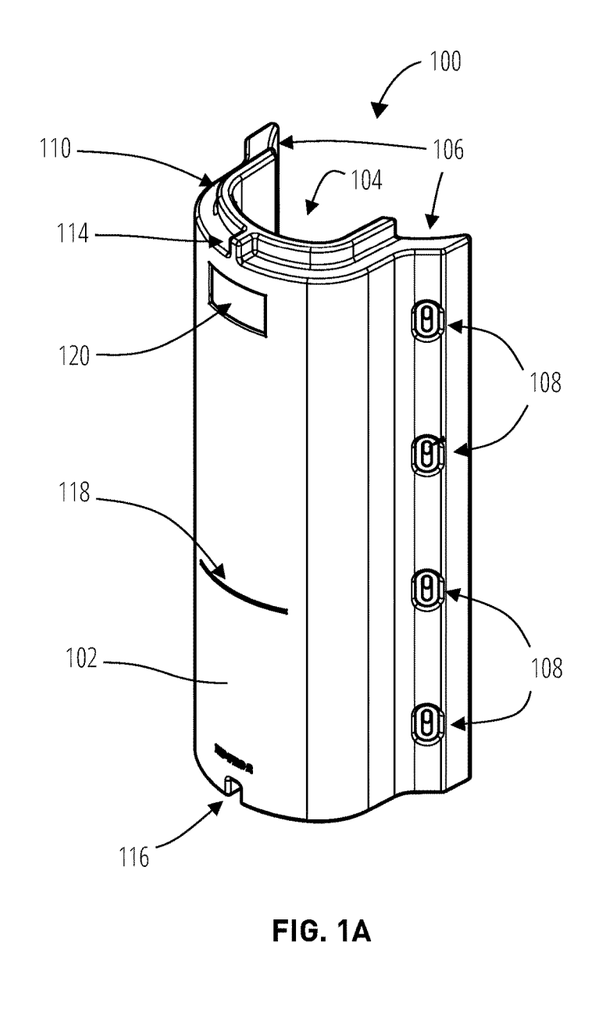
FIG. 1A and FIG. 1B are perspective views of a dip cable protection device, in accordance with one embodiment.
Figure 1B:
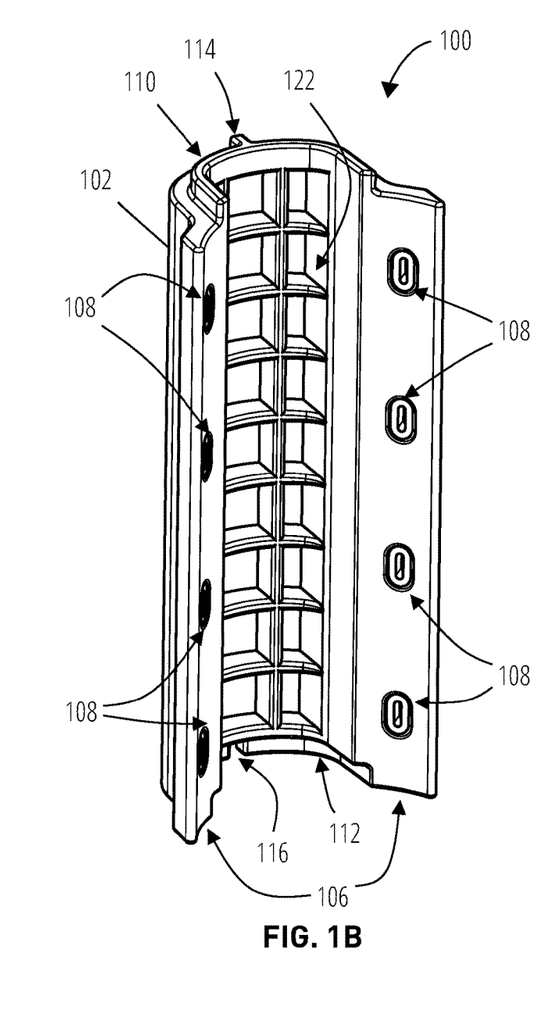

FIG. 1A and FIG. 1B are perspective views of a dip cable protection device 100, in accordance with one embodiment. In this exemplary embodiment, the dip cable protection device 100 is comprised of a single-piece molded body 102, specifically shaped to allow close proximity to a cylindrical object, which in most cases would be a utility pole used by Power or Communications companies. In some embodiments, the molded body 102 is made out of a strong and resilient material, for example rubber. Rubber has many advantages, for example it will not crack and will not be acted upon in a negative fashion by temperature changes and freezing conditions. In addition, if for some reason a rubber device is damaged, the material will not have severe sharp edges and will be far less likely to damage the cables it was designed to protect. Rubber can withstand normal and repetitive contacts much better than concrete without cracking or breaking reducing the number of replacements necessary. If a replacement does become necessary, the cost would be significantly less than replacing concrete and can be completed, when necessary, without having to wait for suitable weather and temperature conditions.

Figure 7:
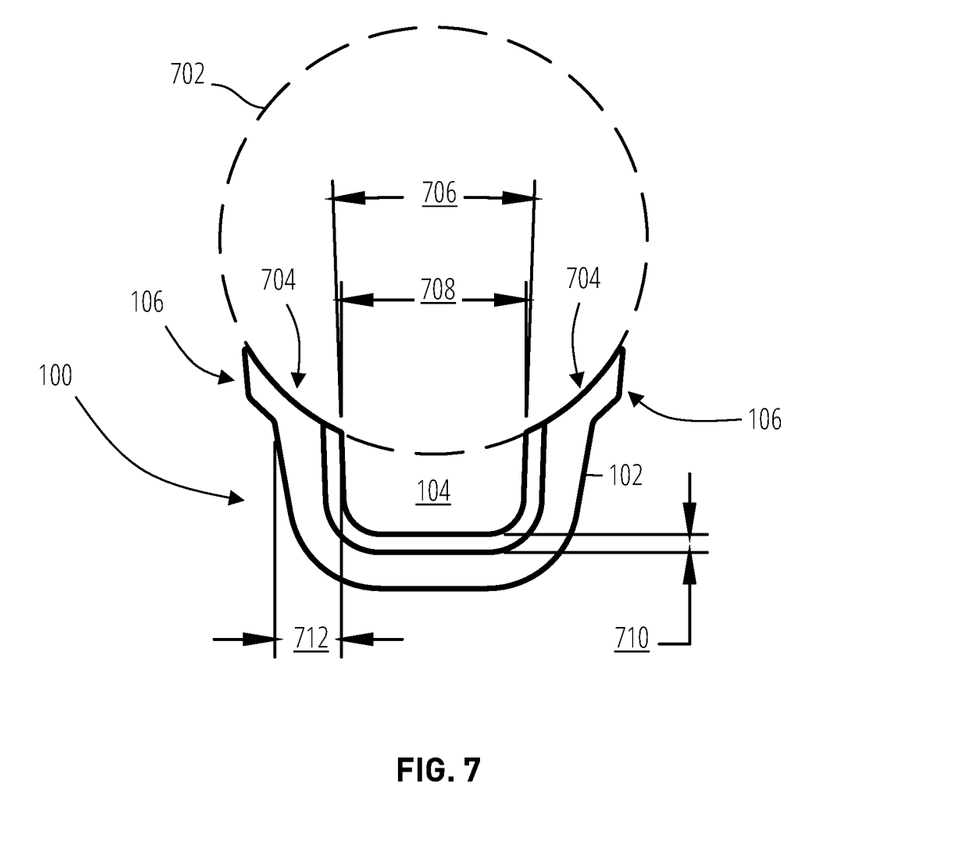
FIG. 7 is a top view of the dip cable protection system of FIG. 8, in accordance with one embodiment.

The body 102 is further shown having a constant cylindrical curvature along the vertical length thereof so as to define, upon being engaged against a cylindrical utility pole, a vertical cavity 104 between the interior concave surface of the body 102 and the pole surface (as shown for example in FIG. 7). The cavity 104 is typically configured to house or enclose any power or communications lines that travel up or down the pole to transition from aerial plant to underground plant.

In addition, curved side fins or flanges 106 are provided along each lateral side or edge of the body 102 that are oriented or configured for mating with the rounded surface of the utility pole. The flanges 106 each comprising a plurality of vertically elongated and vertically aligned slots 108 therein for easy installation of the device against multiple types of poles, for example poles made of wood, fiberglass, metal, concrete or the like. In some embodiments, the slots 108 may also accommodate a lifting cable or handle to make installation easier for man or machine.

In this example, the upper edge of the body 102 is further shown comprising an upward projecting lip or tab portion 110 configured to be engageable with a corresponding recess 112 at the bottom edge of the body 102. This provides a means for easily vertically engaging, stacking, or interlocking multiple devices 100 on top of one another, as will be discussed further below. The tab portion 110 is also shown comprising or forming a notch portion 114 in the middle which is similarly configured to be engageable with a notch receiving portion 116 on the bottom edge of another device 100. This reduces or removes relative lateral movement of the devices 100 during engagement.

The exterior, front or convex surface or side of the body 102 further comprises a ground level marker 118 thereon, in the form of a horizontal line marker, to provide an indication of the depth the device is to be buried at, and an indent 120 for receiving an information plate or label thereon. The interior or concave side or surface of the body 102 comprises plurality of internal ribs 122 forming an interior "honeycomb" structure that maximizes flexible curvature, allows maximum contact with poles of various diameters and reduces the overall weight while maintaining strength and shape integrity.

The skilled person in the art will appreciate that different installation site may characterized via different size variables, including but not limited to: pole diameters, duct diameters, number of ducts at a location, etc. Therefore, the dip cable protection device 100 may be manufactured in several sizes and have some flexibility to properly fit various size poles. These may include, for example, Grade 1 through 6 poles. Power companies normally use Grade 1 and 2 poles while communications companies use Grade 3 and 4 poles. In some embodiments, the size variables also accommodate the number of power or communication lines to be protected. For example, in some embodiments, a single coaxial or fiber cable as small as ½ inch (13 mm) in diameter could be present or there could be four high-voltage power cables having as much as 2 inches (50 mm) in diameter. Some of these cables will be entering directly into the ground and some may be entering standard 4-inch schedule 40 duct structure.

Some embodiments may further comprise inserted or embedded therein an optional RFID and/or NFC tag for retaining thereby the installation date, ownership, installer name location, et. In some embodiments, the RFID and/or NFC tag can also be used as inventory control or for having stored therein any other information or data determined to be useful by the user.

The figures discussed below will include different examples of measurements or specifications for different parts of the dip cable protection device 100. These are only given as an example only, and the skilled person in the art will appreciate that different sizes or measurements may also be considered without deviating from the present disclosure.

Figure 2A:
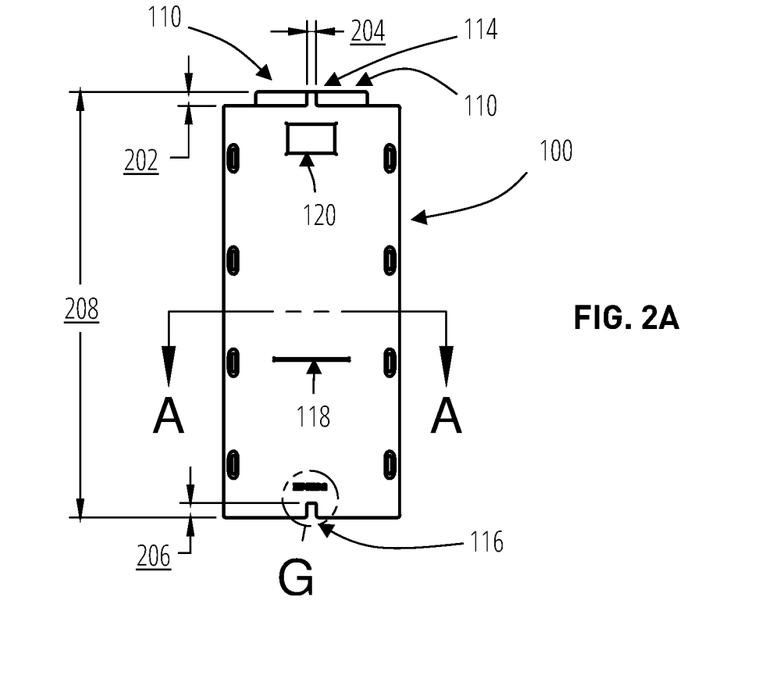
FIG. 2A is a front view of a dip cable protection device, in accordance with one embodiment.

FIG. 2A is a front view of the dip cable protection device 100, in accordance with one embodiment. Shown is the front or concave side of the device 100 comprising for example the indent 118, the ground level marker 118 and the slots 108. The tab portion 114 is also shown having a height or projection 202, and the notch portion 114 having a horizontal width 204. Similarly, the notch receiving portion 206 is also shown having a height 206. Exemplary measurements of the height 208 of the device 100, the height 202 of the tab portion 114, the horizontal width 204 of the notch portion 114, the height of the notch receiving potion 116 are, in inches, include: 46.0, 1.50, 1.00, 1.56, respectively.

Figure 2B:
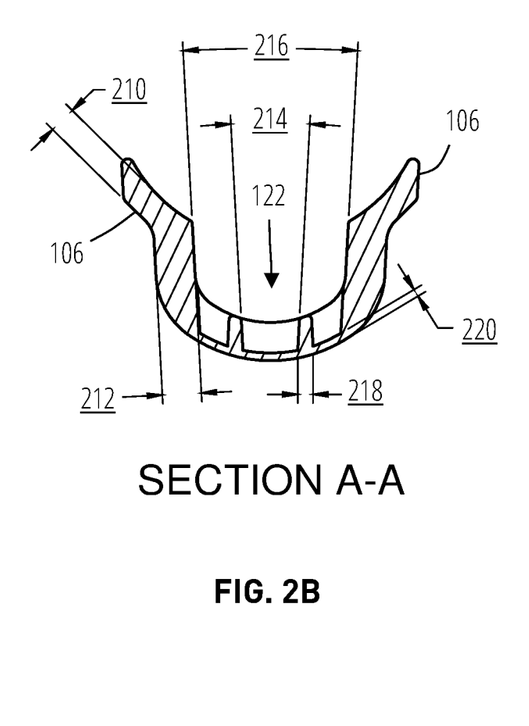
FIG. 2B is a cross-sectional view of the dip cable protection device, in accordance with one embodiment.

FIG. 2B shows a cross-sectional view of the cross-sectional cut A identified in FIG. 2A. This figure also illustrates different measurements associated with the device 100, in accordance with one embodiment. This includes for example a thickness 210 of the flanges 106, a thickness 212 of the lateral sides and different measurements associated with the depth and angles of the internal ribs 122. Non-limiting exemplary values for the angles 214 and 216 include 6 degrees. Non-limiting exemplary values for the thicknesses 210, 212, 218, and 220 include, in inches: 1.77, 2.50, 0.98 and 0.06.

Figure 2C:
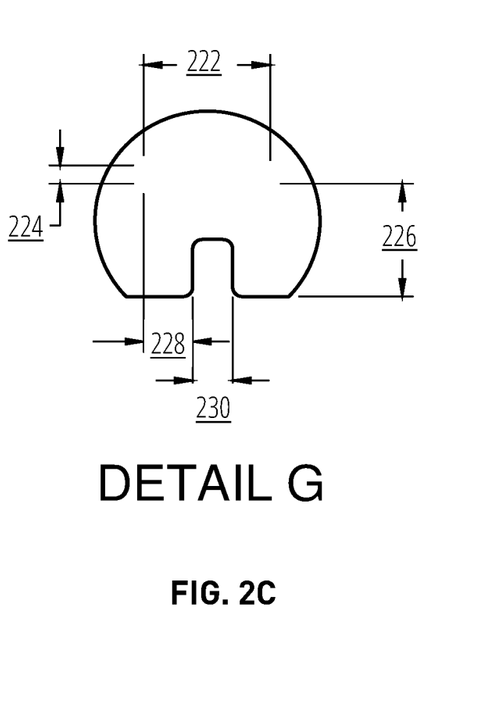
FIG. 2C is front view of a close-up of a (Notch portion?) of the dip cable protection device as illustrated in FIG. 2A, in accordance with one embodiment.

FIG. 2C is a front close-up view of the feature G as identified in FIG. 2A, in accordance with one embodiment. This figure shows different measurements associated with the lower front portion of the device 100 where the notch receiving portion 116 is located. Non-limiting exemplary values for the lengths 222, 224, 226, 228 and 230 include, in inches: 3.37, 0.50, 3.08, 1.31, and 1.06.

Figure 3:
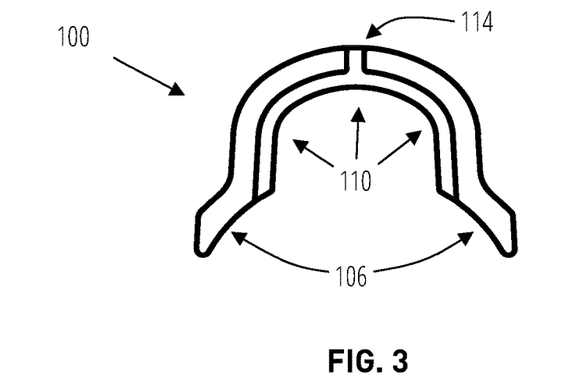
FIG. 3 is a top view of the dip cable protection device, in accordance with one embodiment.

FIG. 3 is a top view of the dip cable protection device 100, in accordance with one embodiment. Shown are the tab portion 110, the notch portion 114 and the curved flanges 106.

Figure 4:
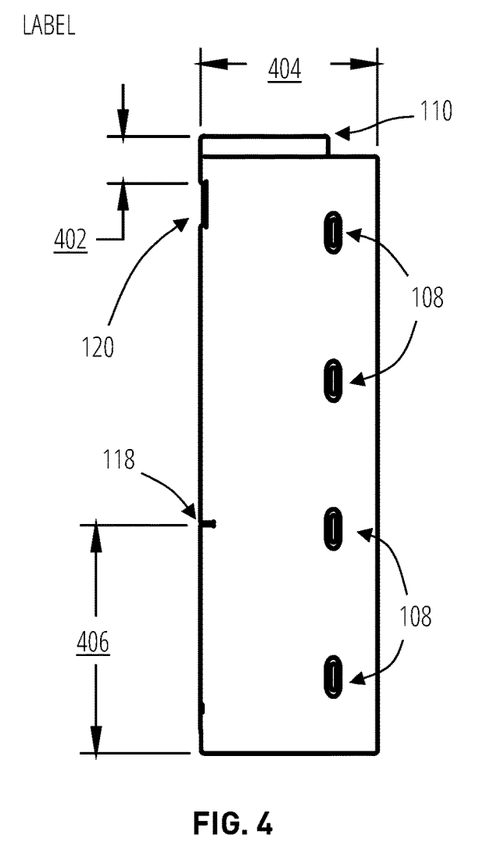
FIG. 4 is a side view of the dip cable protection device, in accordance with one embodiment.

FIG. 4 is a side view of the dip cable protection device 100, in accordance with one embodiment. Shown are the slots 108 and exemplary measurements, for example a distance 402 between the top edge of the indentation 120 and the top edge of the tab portion 110, a horizontal depth 404 of the device 100 and the height 406 of the ground marker 118. Non-limiting exemplary values of the distance 402, depth 404, and height 406 include: 3.50, 13.2, and 17.00 inches, respectively.

Figure 5:
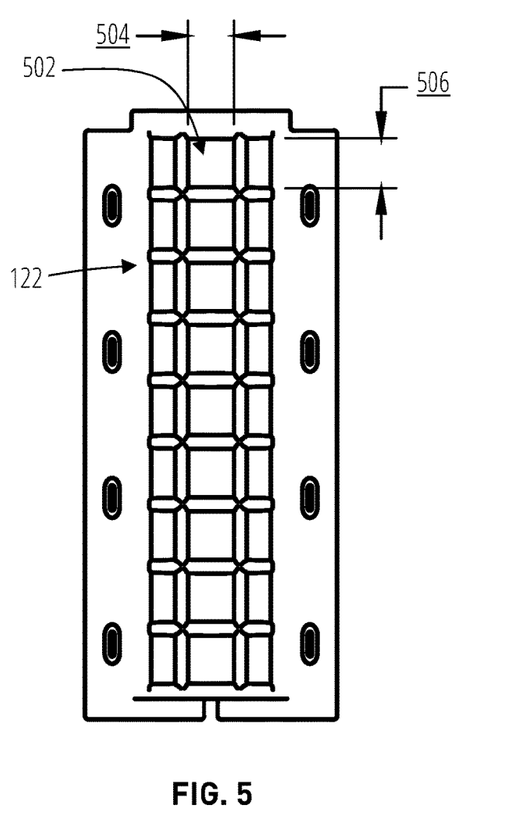
FIG. 5 is a rear view of the dip cable protection device, in accordance with one embodiment.

FIG. 5 is a rear view of the dip cable protection device 100, in accordance with one embodiment. Shown are exemplary measurements for the middle recess portion 502 defined by the ribs 122, including a width 504 and a height 506. Non-limiting exemplary values for the width 504 and height 506 include: 3.51 and 3.78 inches.

Figure 6A:
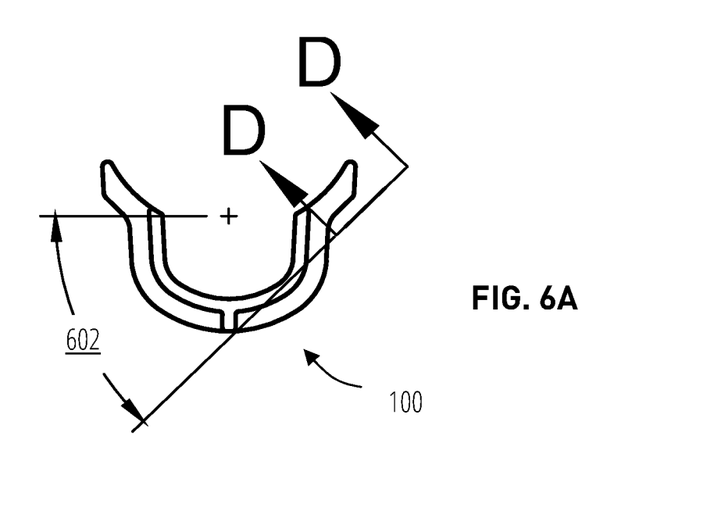
FIG. 6A is another top view of dip cable protection device, in accordance with one embodiment.
Figure 6B:
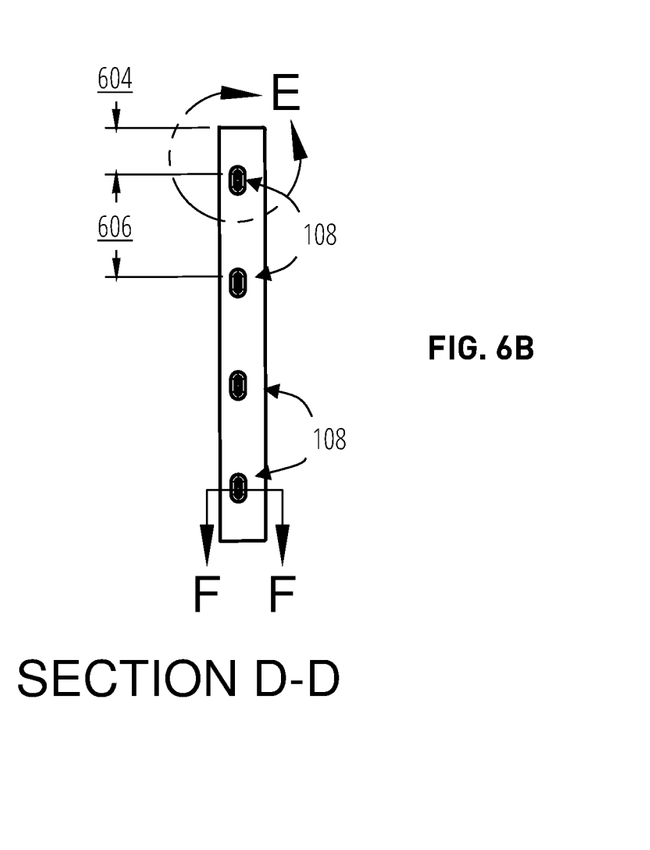
FIG. 6B is a cross-sectional view of a portion the dip cable protection device as illustrated in FIG. 6A, in accordance with one embodiment.

FIG. 6A is another top view of the dip cable protection device 100, in accordance with one embodiment. The drawing defines a cross-sectional cut D at an angle 602 of 45 degrees parallel to one of the flanges CODE, as shown. FIG. 6B is the cross-sectional view of the cut D defined in FIG. 6A. Shown are the slots 108 with exemplary measurements 604 and 606. Non-limiting exemplary values for the measurements 604 and 606 include 5 and 11.04 inches. Also identified are a detailed portion E further illustrated in FIG. 6C and a cross-sectional cut F shown in FIG. 6D.

Figure 6C:
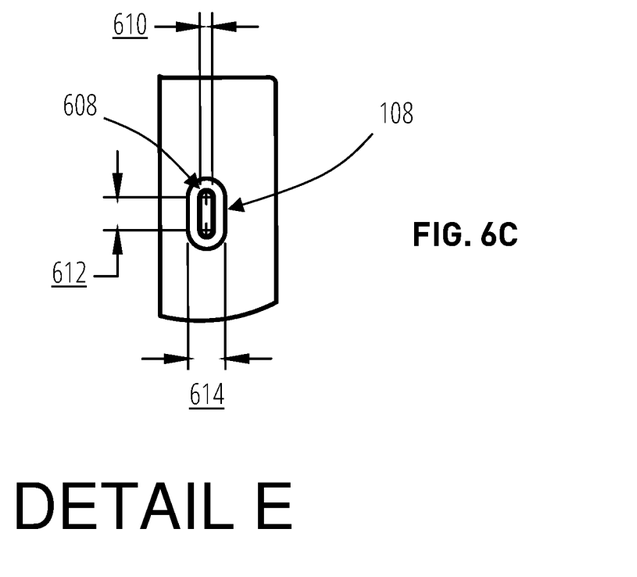
FIG. 6C is a front view of a close-up of a portion of the dip cable protection device of FIG. 6B, in accordance with one embodiment.

FIG. 6C is a close-up view of the detail E of the dip cable protection device 100 identified in FIG. 6B. Shown is an upper portion of a front side of a flange having a slot 108. Also shown is the slightly indented rounded rectangular portion 608 around the slot 108 to allow space for a metal plate that is used to create solid hook for non-wooden pole attachment. Exemplary measurements for the slot 108 are also identified. Non-limiting exemplary values for the measurements 610, 612 and 614 include 0.52 MIN, 1.38 inches and 1.57 inches.

Figure 6D:
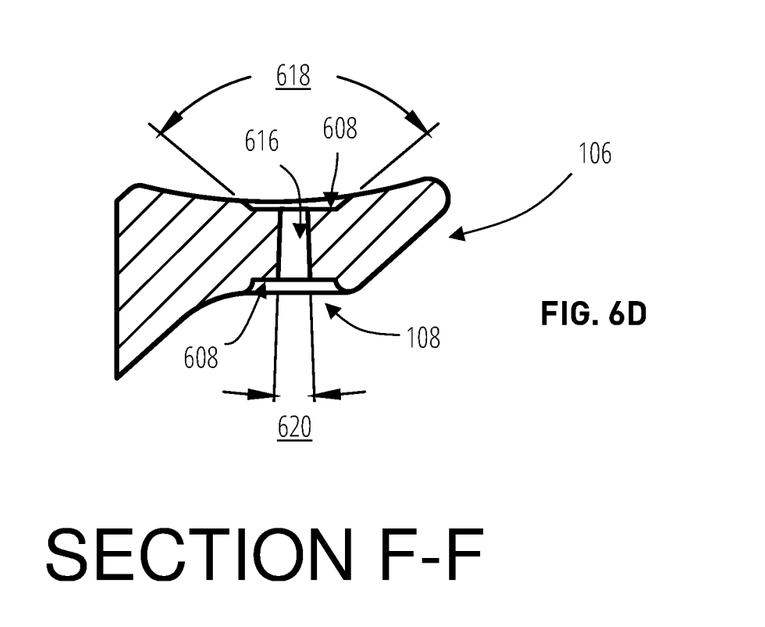
FIG. 6D is a cross-sectional view of a portion of the dip cable protection device of FIG. 6B, in accordance with one embodiment.

FIG. 6D is a cross-sectional view of the cut F identified in FIG. 6B. Shown is the interior structure of a slot 108, shown to comprise an interior channel 616, the indented portions 608 and exemplary measurements related thereto. Non-limiting values for the measurements 618 and 620 include 100 and 4 degrees, respectively.

Figure 8:
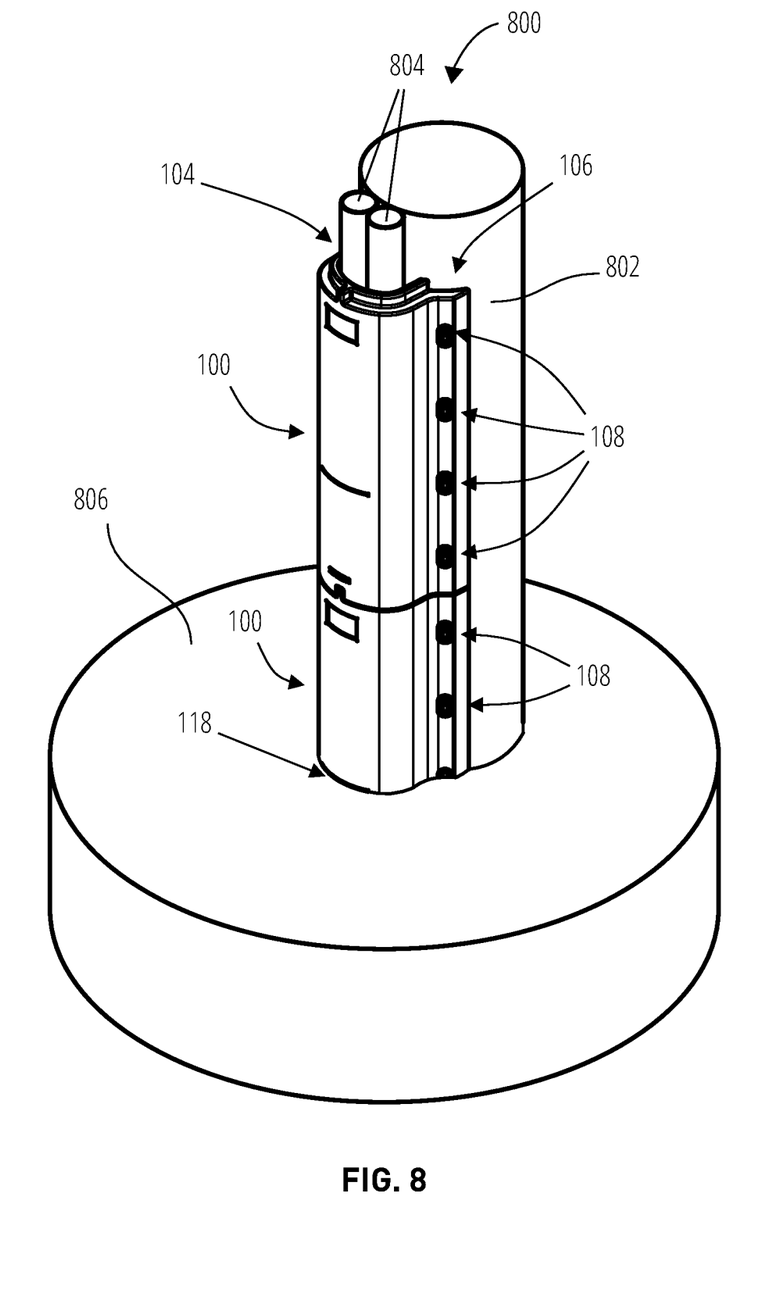
FIG. 8 is a perspective view of a dip cable protection system comprising two dip cable protection devices and installed on a pole, in accordance with one embodiment.

FIG. 7 is a top view of the dip cable protection device 100 of FIG. 8, which illustrates the concave side of the dip protection device 100 abutting or engaging a side of a cylindrical utility pole 702. Shown are the curved fins or flanges 106 having an interior surface 704 shaped to be substantially flush with the cylindrical curvature of the pole 702. This figure also illustrates how the dip cable protection device 100 forms or defines the interior cavity 104 once engaged against the pole 702. Exemplary measurements are also shown. Non-limiting exemplary values for the measurement 706, 708, 710 and 712 include 4°, 10.19 inches, 1.00 inches and 3.67 inches.

The person skilled in the art will appreciate that other variations or embodiments may be considered. For example, some embodiments may take the form of a smaller single-cable dip protection device that are is configured to attach to a standard grade 2 or 3 pole. Other embodiments may comprise a standard unit that includes all of the features mentioned above with regard to the dip protection device 100 but is further configured to be larger in both width and depth to accommodate one or two schedule 40 ducts and/or multiple cables ascending the pole. Larger embodiments may also be considered, for example to be used larger diameter poles, for example 60 to 85 inches, (150 to 212 cm).

With reference to FIG. 8, FIGS. 8A-8B and FIGS. 9A-9B, and in accordance with one embodiment, a dip cable protection system 800 will now be discussed. FIG. 8 shows a perspective view of a dip cable protection system 800 installed on a utility pole 802 comprising attached thereto a plurality of dip cables 804 (for example, one or two schedule 40 ducts and/or multiple cables). The protection system 800 is shown to comprise at least one (here two as an example only) dip cable protection devices 100 discussed above. The system 800 typically comprises a dip cable protection device 100 that is partially buried in the ground 806 up to the ground level marker 118 to protect the dip cables 804 (via the cavity 104) in the vicinity of the ground level. Pressure from the surrounding back fill provides pressure for holding the half-buried device 100 against the pole 802. Notably, if desired, additional devices 100 may be easily vertically stacked and interlocked to extend the protection either deeper into the ground or farther up the pole. In most cases a single device 100 will be adequate. FIG. 8 shows a non-limiting example where a second device 100 is vertically stacked or engaged on top of the first lower half-buried device 100. The devices 100 are configured so that the cavities 104 are vertically aligned and provide protected along the height of the combined devices 100. However, any number of additional devices 100 may be further stacked if additional protection is required lower in the ground or higher up along pole 802, without limitation. Moreover, the devices 100 may be fastened to the pole 802 via the slots 108 using a Stainless steel or Galvanized lag screw with a suitable washer (not shown), or the slots 108 may also accommodate a slide in hook (also not shown) that will allow the installer to use a Stainless-steel band (not shown) that wraps around the pole 802. These bands will be installed if the pole 802 is of a material other than wood or at the discretion of the Utility. Notably, the slots 108 are placed far enough from the outer lateral edge of the side flanges 106 so that it is strong enough to withstand the torque placed upon it over time.

Figure 9:
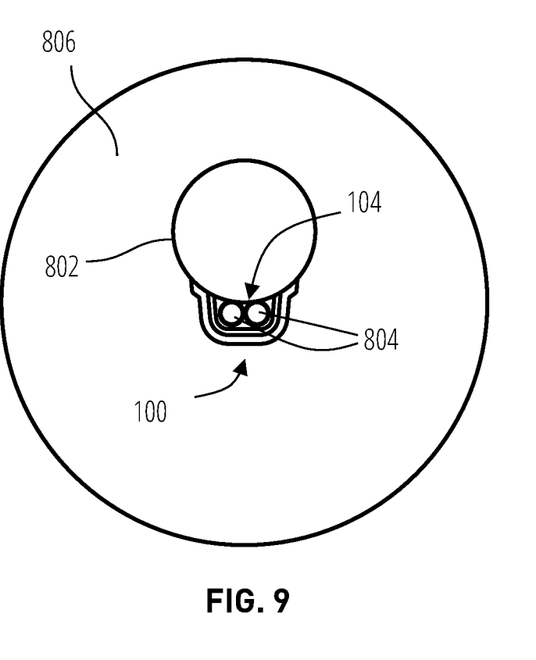
FIG. 9 is another top view of the dip cable protection system of FIG. 8, in accordance with one embodiment.

FIG. 9 is a top view of the dip cable protection system illustrated in FIG. 8. This view better illustrates how the cavity 104 formed by a given device 100 is configured to house and protect the dip cables 804.

Figure 10A:
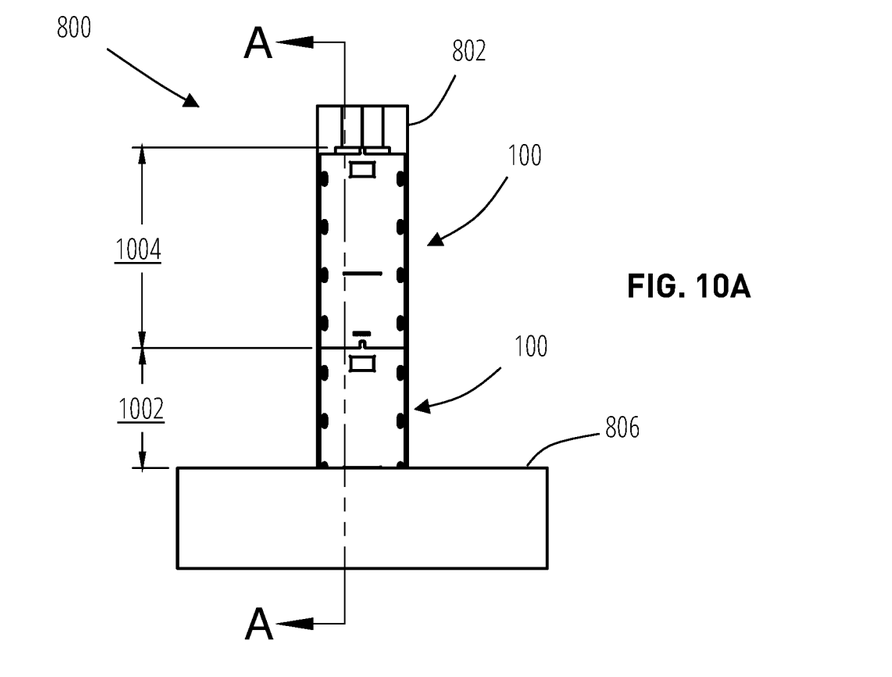
FIG. 10A is a front view of the dip cable protection system of FIG. 8, in accordance with one embodiment.

FIG. 10A is front view of the dip cable protection system 800, in accordance with one embodiment. Shown are exemplary measurements for the heights 1002 and 1004 of the lower and higher devices 100, respectively. Non-limiting exemplary values for the heights 1002 and 1004 include 27.5 inches and 46.0 inches, respectively.

Figure 10B:
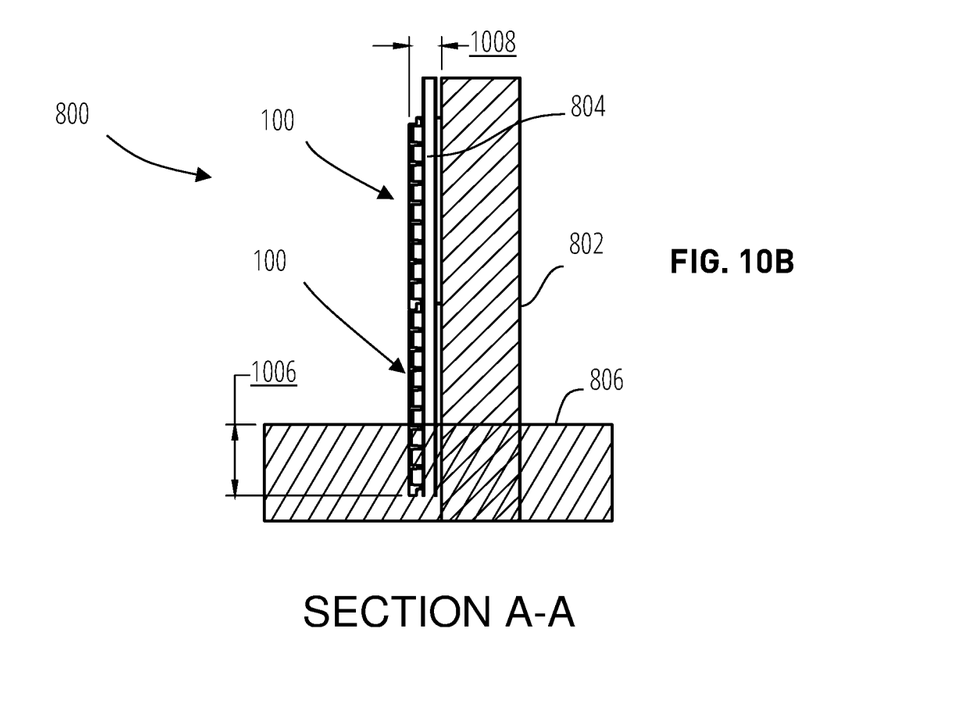
FIG. 10B is a cross-sectional side view of the dip protection system as illustrated in FIG. 10A, in accordance with one embodiment.

FIG. 10B is a cross-sectional view of a cross-section A identified in FIG. 10A, which shows the configuration of the system 800 below the ground level. Also shown are exemplary measurements. Non-limiting exemplary values for the depth 1006 and width 1008 include 17.0 inches and 7.6 inches.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A dip cable protection device for protecting one or more dip cables affixed on a side of a cylindrical pole, the device comprising:
    a single-piece elongated body of a strong and resilient material, the body having a substantially cylindrical curvature along a vertical orientation defining a convex exterior surface and a concave interior surface, and comprising:
    curved flanges coupled to each lateral side of the single-piece body, each curved flange having a curvature substantially matching the curvature of the cylindrical pole and configured for engaging against the side of said cylindrical pole so as to define a vertical cavity between the side of the cylindrical pole and the interior concave surface of the body, said cavity enclosing the one or more dip cables;
    wherein said concave interior surface comprises a plurality of ribs defined therein forming a honeycomb structure.

2. The dip cable protection device of claim 1, wherein each curved flange comprises near an outer lateral edge thereof a plurality of vertically elongated and vertically aligned slots for receiving therethrough a fastener to fasten the dip cable protection device on the cylindrical pole.

3. The dip cable protection device of claim 2, wherein each slot of said plurality of vertically elongated and vertically aligned slots is surrounded by an indented rounded rectangular portion configured for receiving a metal plate therein.

4. The dip cable protection device of claim 1, wherein said dip cable protection device is configured so as to be vertically stackable.

5. The dip cable protection device of claim 4, wherein said single-piece body comprises a top edge and a bottom edge, the top edge comprising along a width thereof a raised tab portion configured to engage a corresponding recess portion along a same width of the bottom edge for vertically stacking two or more dip cable protection devices.

6. The dip cable protection device of claim 5, wherein said raised tab portion comprises a notch portion in the middle thereof oriented perpendicularly to the raised tab portion, the notch portion being engageable on a corresponding notch receiving portion on the recess portion of the bottom edge of the device.

7. The dip cable protection device of claim 1, wherein said convex exterior surface comprises thereon a ground level marker for indicating a depth at which the dip cable protection device can be buried.

8. The dip cable protection device of claim 1, wherein said convex exterior surface comprises thereon a recess therein for receiving an information plate or label.

9. The dip cable protection device of claim 1, wherein said strong and resilient material is rubber.

10. The dip cable protection device of claim 1, wherein said single-piece elongated body has embedded therein a RFID or NFC tag for storing data.

11. The dip cable protection device of claim 10, wherein said data comprises information selected from the group consisting of: an installation date, ownership, installer name, installer location, and inventory number.

12. A dip cable protection system for protecting a plurality of dip cables fastened to a cylindrical pole, the system comprising:
   a plurality of dip cable protection devices, each dip cable protection device comprising a single-piece elongated body of a strong and resilient material, the body having a substantially cylindrical curvature along a vertical orientation defining a convex exterior surface and a concave interior surface, and curved flanges coupled to each lateral side of the single-piece body, each curved flange having a curvature substantially matching the curvature of the cylindrical pole and configured for engaging against the side of said cylindrical pole so as to define a vertical cavity between the side of the cylindrical pole and the interior concave surface of the body, said cavity enclosing the one or more dip cables;
   wherein said single-piece body of each dip cable protection device comprises a top edge and a bottom edge, the top edge comprising along a width thereof a raised tab portion configured to engage a corresponding recess portion along a same width of the bottom edge for vertically stacking two or more dip cable protection devices;
   wherein said convex exterior surface of each dip cable protection device comprises thereon a ground level marker for indicating a depth at which the dip cable protection device can be buried; and
   wherein said plurality of dip cable protection devices are engaged against the cylindrical pole and vertically stacked one above another via engagement of said raised tab portion with said recess portion of two adjacent dip cable protection devices, said plurality of dip cable protection devices having each cavity vertically aligned for housing said plurality of dip cables.

13. The dip cable protection system of claim 12, wherein one of said plurality of dip cable protection devices is partially buried at a base of the cylindrical pole at a depth corresponding to the ground level marker.

14. The dip cable protection system of claim 13, wherein each curved flange of each of said plurality of dip cable protection devices comprises near an outer lateral edge thereof a plurality of vertically elongated and vertically aligned slots for receiving therethrough a fastener to fasten the dip cable protection device on the cylindrical pole.

15. The dip cable protection system of claim 14, wherein said fastener includes a lag screw and a washer.

16. The dip cable protection system of claim 14, wherein said fastener includes a band engaged in two opposite slots wrapping around the cylindrical pole.

* * * * *